United States Patent [19]

Guistina et al.

[11] Patent Number: 5,611,847

[45] Date of Patent: Mar. 18, 1997

[54] AQUEOUS PIGMENT DISPERSIONS CONTAINING SEQUESTERING AGENTS FOR USE AS INK JET PRINTING INKS

[75] Inventors: Robert A. Guistina, Rochester; Domenic Santilli, Webster; Douglas E. Bugner, Rochester, all of N.Y.

[73] Assignee: Eastman Kodak Company, Rochester, N.Y.

[21] Appl. No.: 351,870

[22] Filed: Dec. 8, 1994

[51] Int. Cl.⁶ ........................................ C09D 11/02
[52] U.S. Cl. .................. 106/20 R; 106/496; 106/499
[58] Field of Search ................... 106/496, 499, 106/20 R

[56] References Cited

U.S. PATENT DOCUMENTS 4,150,997  4/1979  Hayes ........................... 106/15.05
5,059,248  10/1991  Signorino et al. ..................... 106/402
5,125,968  6/1992  Takimoto et al. .................... 106/20 R

OTHER PUBLICATIONS

CTFA International Cosmetic Dictionary, Fourth Edition, May 1992, pp. 441 and 442 Copyright 1991.

Primary Examiner—Helene Klemanski
Attorney, Agent, or Firm—John R. Everett

[57] ABSTRACT

An ink composition for utilization in ink-jet printing is provided which comprises an aqueous medium, a metallized azo red pigment and, as a sequestering agent, an alkali metal, an alkaline earth metal or an ammonium salt of a linear aliphatic substituted glycine such as a salt of ethylene diamine tetraacetic acid or nitrilo triacetic acid. The composition has been found to remain stable for extended periods of time.

5 Claims, No Drawings

AQUEOUS PIGMENT DISPERSIONS CONTAINING SEQUESTERING AGENTS FOR USE AS INK JET PRINTING INKS

BACKGROUND OF THE INVENTION

1. Field of the Invention

The present invention relates to a recording liquid suitable for ink-jet recording which employs a metallized azo red pigment.

2. Description of the Related Art

Ink-jet recording is rapidly gaining acceptance by the public as a recording process because it generates little noise and permits economical multicolor printing.

The ink-jet recording process is a process for performing recording on a recording element or medium in which droplets of a recording liquid (i.e., an ink) are ejected or propelled from a print head having one or more orifices onto the recording element.

In ink-jet recording, numerous schemes are utilized to control the deposition of the ink droplets onto the image-recording element to yield the desired image. In one process, known as continuous ink-jet recording, a continuous stream of droplets is charged and deflected in an image-wise manner onto the surface of the image-recording element, while unimaged droplets are caught and returned to an ink sump. In another process, known as drop-on-demand ink-jet recording, individual ink droplets are projected as needed onto the image-recording element to form the desired image. Common methods of controlling the projection of ink droplets in drop-on-demand printing include piezoelectric transducers and thermal bubble formation.

The recording elements used in such recording processes typically comprise the so-called "plain papers," and, for higher image quality applications, an ink-receiving or ink-receptive layer provided on a support. The recording elements include those which are intended for reflection viewing, which usually have an opaque support, and those which are intended for viewing by transmitted light, which usually have a transparent or translucent support.

The ink compositions used to image the image-recording elements employed in such recording processes are typically liquid compositions comprising a solvent or a carrier liquid, dyes or pigments, humectants, organic solvents, detergents, thickeners, preservatives, and the like. The solvent or carrier liquid can be predominantly water, although ink compositions in which organic materials such as polyhydric alcohols are the predominant carrier or solvent liquid also are used. The dyes used in such compositions are typically water-soluble direct or acid type dyes.

When metallized azo red pigments such as Pigment Red 57 and Pigment Red 52 are employed as coloring agents in water-based ink compositions, i.e., ink compositions which consist predominantly of water as a carrier fluid, it has been found that the ink compositions rapidly increase in viscosity, thicken and eventually gel rendering them useless for ink-jet applications. Thus, it would be highly desirable to provide, as ink compositions suitable for use in ink-jet printing processes, pigment dispersions or suspensions of metallized azo red pigments such as Pigment Red 57 and Pigment Red 52 in water, which are stable and fluid for extended periods of time and in which the pigment particles resist settling. The present invention provides such ink compositions by including in the compositions, as a sequestering agent to prevent the compositions from thickening and/or gelling, an alkali metal, an alkaline earth metal or an ammonium salt of a linear aliphatic substituted glycine.

SUMMARY OF THE INVENTION

Thus, in accordance with the present invention there is provided, as an ink composition for use in ink jet printing, a stable, fluid, aqueous dispersion composition comprising a metallized azo red pigment, a sequestering agent selected from the group consisting of an alkali metal, an alkaline earth metal or an ammonium salt of a linear aliphatic substituted glycine and water.

DESCRIPTION OF THE PREFERRED EMBODIMENTS

It has been found that improved aqueous, fluid and stable dispersions containing metallized azo red pigments such as Pigment Red 57 and Pigment Red 52 can be formulated by utilizing, as a sequestering agent, an alkali metal, an alkaline earth metal or an ammonium salt of a linear aliphatic substituted glycine. Through the use of such a sequestering agent, aqueous dispersions may be formulated which retain their stability, fluidity and usefulness for extended periods of time and resist settling or lumping.

The sequestering agents which are useful to impart improved stability characteristics to fluid, aqueous dispersions are the alkali metal, alkaline earth metal and ammonium salts of linear aliphatic substituted glycine compounds. As used herein, the term "linear aliphatic substituted glycine" designates glycine compounds in which the amino group of glycine has been substituted with linear aliphatic groups. Illustrative of the sequestering agents of this type which may be used in the practice of the invention are the alkali metal (e.g., sodium), alkaline earth metal (e.g., calcium) and ammonium salts of ethylene diamine tetraacetic acid, nitrilo triacetic acid, diethylene triamine pentaacetic acid, hydroxyethylene diamine triacetic acid, dihydroxyethyl glycine, iminodiacetic acid and ethanol diglycine. Similar salts of other linear aliphatic substituted glycine compounds known to the art may also be used. The aforementioned salts of ethylene diamine tetraacetic acid are particularly preferred because of their availability, cost effectiveness and nontoxicity.

Through the use of such sequestering agents, stable, fluid, aqueous dispersions containing approximately 1 to 20 weight percent, preferably 4 to 12 weight percent of pigment, based on the total weight of the dispersion, may be prepared with the sequestering agent constituting approximately 0.5 to 10 weight percent, preferably approximately 1 to 5 weight percent, of the dispersion. Such aqueous dispersions have been found to retain their stability, i.e., remain fluid and resistant to settling and gelling for extended periods of time.

The metallized azo red pigments present in the water-based ink compositions of the present invention are acid salt azo pigments having the structure:

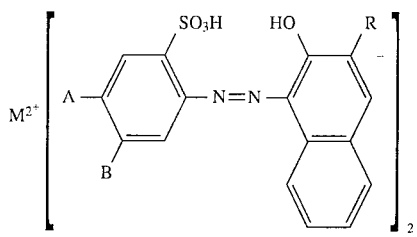

wherein

A=CH₃, B=Cl, R=COOH and M=barium;

A=CH₃, B=Cl, R=COOH and M=calcium;

A=CH₃, B=Cl, R=COOH and M=manganese;

A=Cl, B=CH₃, R=COOH and M=calcium;

A=Cl, B=CH₃, R=COOH and M=manganese;

A=Cl, B=CH₃, R=H and M=barium;

A=Cl, B=C₂H₅, R=COOH and M=calcium; or

A=CH₃, B=H, R=COOH and M=calcium.

Presently preferred metallized azo red pigments are Pigment Red 57 where A=CH₃, B=H, C=COOH and M=calcium, Pigment Red 52:1 where A=Cl, B=CH₃, C=COOH and M=calcium and Pigment Red 52:2 where A=Cl, B=CH₃, C=COOH and M=manganese.

The foregoing metallized azo red pigments are available commercially from several suppliers such as Chemetron Corporation, Holland, Mich.; Harshaw Chemical Company, Cleveland, Ohio and Sun Chemical Corporation.

The aqueous dispersion compositions of the invention are useful for preparing ink compositions for use in ink jet printing processes.

The aqueous media to be used for the recording liquids or ink compositions of the invention comprise water, preferably deionized water.

It is believed that the sequestering agents utilized in the present invention prevent the ink compositions containing the aforementioned metallized azo red pigments from thickening or gelling by forming water-soluble complexes with the multi-valent cations, i.e., calcium, manganese and barium present in the pigments, thereby preventing the multi-valent cations from precipitating out in the aqueous media. Without the presence of the sequestering agents in the ink compositions, the multi-valent cations contained in the pigments will interact with the otherwise anionically-stabilized pigment particles and form electrostatic crosslinks or particle bridges between the pigment particles which causes coagulation, thickening and/or gelling of the ink.

It has been found to be desirable to include a pH buffer in the aqueous media to ensure that the sequestering agent does not become pronated which would reduce its efficiency in preventing coagulation and thickening of the ink composition. This can be accomplished by using a pH 10.00 buffer solution comprising an aqueous solution of sodium carbonate and sodium bicarbonate at a 1:1 mol ratio.

As mentioned previously, the concentration of the pigment in the aqueous dispersion, i.e., the ink composition is usually within a range of from 1 to 20 percent by weight, preferably 4 to 12 percent by weight, based on the total weight of the dispersion.

The concentration of the sequestering agent in the aqueous dispersion is usually within a range of 0.5 to 10 percent by weight, preferably 1 to 5 percent by weight, based on the total weight of the dispersion.

Other ingredients or addenda conventionally added to ink-jet compositions also can be incorporated into the aqueous dispersions which make up the ink compositions of the present invention. For example, a humectant such as ethylene glycol, propylene glycol, butylene glycol, diethylene glycol, glycerol or a mixture of glycerol and diethylene glycol, and the like in an amount of from about 0.5 to 20 percent by weight, based on the total weight of the aqueous dispersion, can be incorporated into the dispersion to help prevent the ink from drying out in the orifices of the printhead. Further, a penetrant, such as ethanol, n-propanol, n-butanol, sec-butnol, or t-butanol can be incorporated into the aqueous dispersion at a concentration of from about 0.1 to about 10 percent by weight, based on the total weight of the dispersion, to increase the ability of the ink to penetrate or be absorbed into the ink-receptive layer of the recording element. Also, a surfactant such as an ethoxylated acetylenic glycol or an alkylated polyethylene glycol ether, can be incorporated into the aqueous dispersion at a concentration of from about 0.001 to about 3.0 percent by weight, based on the total weight of the dispersion, to adjust the surface tension of the ink to the desired range. Typically, the surface tension will range from about 20 to 60 dynes/cm. The optimum surface tension will depend upon the specific application. For example, for plain paper, surface tensions in the range of about 25 to 50 dynes/cm are desired. For color printing, in order to minimize bleeding of one color into an adjacent color, a preferred surface tension is from about 25 to 35 dynes/cm. A biocide, at a concentration of from about 0.01 to about 1.0 percent by weight, based on the total weight of the aqueous dispersion, can be incorporated into the dispersion in order to prevent unwanted microbial growth in the ink which may occur over time. Especially useful biocides are Proxel GXL available from Zeneca Colours and Dowicil 75.

Additional conventional additives or addenda including thickeners, conductivity enhancing agents, drying agents, defoaming agents, and the like also may be optionally incorporated into the aqueous dispersions of the invention, if desired.

The viscosity of the ink compositions of the invention should be from about 1.0 to 10.0 centipoise, preferably from about 2.0 to about 6.0 centipoise.

The following examples further illustrate the present invention.

EXAMPLE 1

Samples of stable, fluid aqueous ink dispersions of the invention were prepared as follows:

Concentrates, as set forth in Table 1, below, were prepared by milling the listed components for 72 hours on a SWECO vibratory mill. Each concentrate (33.2 g) was then diluted with 12.0 g deionized water, 0.6 g polyethylene glycol ether (obtained from Hüls America as Marlipal MF), 0.1 g biocide (obtained from Zeneca Colours as Proxel GXL) and 4.0 g of 1,5-pentanediol to form the aqueous dispersions. Each sample was stored in a capped glass bottle and daily observations were made as to its condition. These observations are summarized in Table 2, below.

TABLE 1

| | Milling Concentrate Components (grams) | | | | |
|---|---|---|---|---|---|
| Sample | Pigment Red 57:1 | BYK-181[1] | DI-H₂O[2] | pH10 Buffer[3] | Na₄.EDTA[4] |
| A | 20.0 | 16.0 | 97.0 | — | 2 |
| B | 20.0 | 16.0 | 48.5 | 48.5 | 1 |

TABLE 1-continued

| | Milling Concentrate Components (grams) | | | | |
|---|---|---|---|---|---|
| Sample | Pigment Red 57:1 | BYK-181[1] | DI-H$_2$O[2] | pH10 Buffer[3] | Na$_4$.EDTA[4] |
| C | 20.0 | 16.0 | 48.5 | 48.5 | 2 |
| D | 20.0 | 16.0 | 48.5 | 48.5 | 3 |

[1]DisperBYK-181 = an anionic dispersing aid obtained from BYK-Chemie USA
[2]DI-H$_2$O = deionized water
[3]Buffer = an aqueous solution of sodium carbonate and sodium bicarbonate at a 1:1 mol ratio.
[4]Na$_4$.EDTA = tetrasodium ethylene diamine tetraacetic acid

TABLE 2

Stability of Aqueous Dispersions (Inks)

| Sample | g Na$_4$.EDTA In Concentrate | Stability | | | |
|---|---|---|---|---|---|
| | | 24 hrs | 48 hrs | 96 hrs | 336 hrs |
| A | 2.0 | Good | Good | Good | Good |
| B | 1.0 | Good | Good | Good | Good |
| C | 2.0 | Good | Good | Good | Good |
| D | 3.0 | Good | Good | Good | Good |

As shown in Table 2, the addition of Na$_4$·EDTA to the aqueous dispersion (i.e., ink formulation) containing Pigment Red 57 was effective in preventing the thickening and gelling of the ink (Samples A through D).

COMPARATIVE EXAMPLE 2

Aqueous dispersions similar in composition to the aqueous dispersion compositions of Example 1, but containing no Na$_4$·EDTA, were prepared as follows.

Concentrates, as set forth in Table 3, below, were prepared by milling the listed components for 72 hours on a SWECO vibratory mill. Each concentrate (33.2 g) was then diluted with 12.0 g deionized water, 0.6 g polyethylene glycol ether (obtained from Hüls America as Marlipal MF), 0.1 g biocide (obtained from Zemeca Colours as Proxel GXL) and 4.0 g of 1.5-pentanediol to form the aqueous dispersions. Each sample was stored in a capped glass bottle and daily observations were made as to its condition. These observations are summarized in Table 4, below.

TABLE 3

| | Milling Concentrate Components (grams) | | | | |
|---|---|---|---|---|---|
| Sample | Pigment Red 57 | BYK-181[1] | DI-H$_2$O[2] | pH 10 Buffer[3] | Na$_4$.EDTA[4] |
| E | 20.0 | 16.0 | 97.0 | — | — |
| F | 20.0 | 16.0 | 48.5 | 48.5 | — |

[1]DisperBYK-181 = an anionic dispersing aid obtained from BYK-Chemie USA
[2]DI-H$_2$O = deionized water
[3]Buffer = an aqueous solution of sodium carbonate and sodium bicarbonate at a 1:1 mol ratio.
[4]Na$_4$·EDTA = tetrasodium ethylene diamine tetraacetic acid

TABLE 4

Stability of Aqueous Dispersions (Inks)

| Sample | g Na$_4$.EDTA In Concentrate | Stability | | | |
|---|---|---|---|---|---|
| | | 24 hrs | 48 hrs | 96 hrs | 336 hrs |
| E | 0 | Gelled | → | → | → |
| F | 0 | Thick | Thick | Gelled | → |

As shown in Table 4, aqueous dispersions not of the invention containing no Na$_4$·EDTA exhibited rapid thickening and gelling making them unsuitable for ink-jet applications.

The invention has been described in detail with particular reference to preferred embodiments thereof, but it will be understood that variations and modifications can be effected within the spirit and scope of the invention.

What is claimed:

1. A stable ink jet ink having a viscosity from about 1 to about 10 centipoise and comprising a dispersant, from 1 to 20 wt/% of a metallized azo red pigment and 0.5 to 10 wt/% of a sequestering agent selected from the group consisting of an alkali metal, an alkaline earth metal or an ammonium salt of a linear aliphatic substituted glycine and water.

2. An ink jet ink according to claim 1, wherein the sequestering agent is selected from the group consisting of an alkali metal, an alkaline earth metal or an ammonium salt of ethylene diamine tetraacetic acid, nitrilo triacetic acid, diethylene triamine pentaacetic acid, hydroxyethylene diamine triacetic acid, dihydroxethyl glycine, iminodiacetic acid and ethanol diglycine.

3. An ink jet ink according to claim 2, wherein the sequestering agent is the tetrasodium salt of ethylene diamine tetraacetic acid.

4. An ink jet ink according to claim 2, wherein the sequestering agent is contained in an amount of from 1 to 5 percent by weight, based on the total weight of the composition.

5. An ink jet ink according to claim 1, wherein the metallized azo red pigment is represented by the structure:

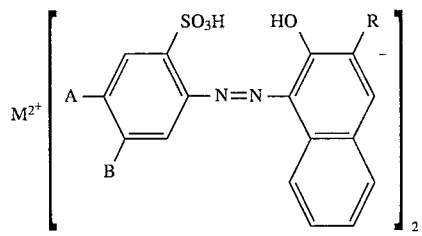

wherein

A is CH$_3$, B is Cl, R is COOH and M is barium;

A is CH$_3$, B is Cl, R is COOH and M is calcium;

A is CH$_3$, B is Cl, R is COOH and M is manganese;

A is Cl, B is CH$_3$, R is COOH and M is calcium;

A is Cl, B is CH$_3$, R is COOH and M is manganese;

A is Cl, B is CH$_3$, R is H and M is barium;

A is Cl, B is C$_2$H$_5$, R is COOH, M is calcium; or

A is CH$_3$, B is H, R is COOH and M is calcium.

* * * * *